(12) United States Patent
Sheinfeld

(10) Patent No.: US 9,485,315 B2
(45) Date of Patent: Nov. 1, 2016

(54) SYSTEM AND METHOD FOR GENERATING A CUSTOMIZED SINGULAR ACTIVITY STREAM

(71) Applicant: MAINSOFT R&D LTD., Lod (IL)

(72) Inventor: Roy Sheinfeld, Tel Aviv (IL)

(73) Assignee: HARMON.IE R&D LTD., Lod (IL)

( * ) Notice: Subject to any disclaimer, the term of this patent is extended or adjusted under 35 U.S.C. 154(b) by 485 days.

(21) Appl. No.: 13/925,052

(22) Filed: Jun. 24, 2013

(65) Prior Publication Data

US 2014/0108535 A1 Apr. 17, 2014

Related U.S. Application Data

(63) Continuation-in-part of application No. 13/900,045, filed on May 22, 2013.

(60) Provisional application No. 61/714,296, filed on Oct. 16, 2012.

(51) Int. Cl.
| | |
|---|---|
| *G06F 15/16* | (2006.01) |
| *H04L 29/08* | (2006.01) |
| *G06Q 10/10* | (2012.01) |
| *G06Q 50/00* | (2012.01) |

(52) U.S. Cl.
CPC ............... *H04L 67/22* (2013.01); *G06Q 10/10* (2013.01); *G06Q 50/01* (2013.01); *H04L 67/2838* (2013.01)

(58) Field of Classification Search
CPC ............................ H04L 67/306; H04L 67/22
USPC ......................................................... 709/204
See application file for complete search history.

(56) References Cited

U.S. PATENT DOCUMENTS

| | | | |
|---|---|---|---|
| 7,577,916 B2 | 8/2009 | Pedersen et al. | |
| 7,822,604 B2 | 10/2010 | Amini et al. | |
| 8,495,709 B1 | 7/2013 | Cooper et al. | |
| 8,745,057 B1 | 6/2014 | Li | |
| 2006/0248087 A1 | 11/2006 | Agrawal et al. | |
| 2008/0103770 A1 | 5/2008 | Amini et al. | |
| 2012/0078870 A1 | 3/2012 | Bazaz | |
| 2012/0130862 A1 | 5/2012 | Tedjamulia et al. | |
| 2012/0143701 A1 | 6/2012 | Reis et al. | |
| 2012/0158494 A1 | 6/2012 | Reis et al. | |
| 2012/0203831 A1 | 8/2012 | Schoen et al. | |
| 2013/0103447 A1* | 4/2013 | Melander | G06Q 50/01 705/7.15 |
| 2013/0103757 A1* | 4/2013 | Mitchell | G06Q 50/01 709/204 |

* cited by examiner

*Primary Examiner* — Adnan Mirza
(74) *Attorney, Agent, or Firm* — M&B IP Analysts, LLC

(57) ABSTRACT

A method and system for generating and displaying a customized activity stream are provided. The method includes receiving a query from a client node; receiving at least one user-related parameter and at least one client node-related parameters; receiving unstructured data collected from a plurality of data sources; generating a plurality of contextual activity streams respective of the received unstructured data and the received query; generating a customized singular activity stream respective of the at least one user-related parameter and the at least one client node-related parameter, wherein the customized singular activity stream include a plurality of data items from one or more of the plurality of contextual activity streams; and causing a display of the customized singular activity stream over the client node.

19 Claims, 5 Drawing Sheets

SYSTEM AND METHOD FOR GENERATING A CUSTOMIZED SINGULAR ACTIVITY STREAM

CROSS REFERENCE TO RELATED APPLICATIONS

This application claims the benefit of U.S. Provisional Application No. 61/714,296 filed on Oct. 16, 2012, and is a continuation-in-part of U.S. patent application Ser. No. 13/900,045 having a filing date of May 22, 2013. The contents of which are herein incorporated by reference.

TECHNICAL FIELD

The invention generally relates to social networks, and more particularly to systems and methods for aggregating data received from a plurality of sources.

BACKGROUND

Social networking platforms allow people to connect with other people who have at least a common interest. The vast growth in mobile technology has increased the popularity of social networking platforms by allowing people to chat with their friends anytime and from anywhere. An activity stream is a list of recent activities performed by one or more users. The implementation of an activity stream is commonly found in social networking platforms. An example is the news feed of Facebook®.

Though activity streams arise from social networking platforms, nowadays they have also become common in enterprise social networks. The implementation of an activity stream in an enterprise social network allows online interaction among the enterprise's employees. Furthermore, such implementation provides a cross-enterprise communication platform that enables a constant update of the enterprise's latest news.

In large enterprises, employees are typically required to interface with several activity streams where each activity stream usually displays information received from a different source. Such activity streams are commonly swamped with content that is often irrelevant to a user. As a result, enterprise social networks are inefficient tools for most employees trying to extract relevant information therefrom.

It would be therefore advantageous to provide a solution by providing a unified activity stream that displays information from several sources.

SUMMARY

Certain embodiments disclosed herein include a method for generating and displaying a customized activity stream. The method includes receiving a query from a client node; receiving at least one user-related parameter and at least one client node-related parameters; receiving unstructured data collected from a plurality of data sources; generating a plurality of contextual activity streams respective of the received unstructured data and the received query; generating a customized singular activity stream respective of the at least one user-related parameter and the at least one client node-related parameter, wherein the customized singular activity stream include a plurality of data items from one or more of the plurality of contextual activity streams; and causing a display of the customized singular activity stream over the client node.

Certain embodiments disclosed herein also include a system configured to generate and display a customized singular activity stream. The system comprises a network interface communicatively connected to a network; a processor; a memory coupled to the processor containing a plurality of instructions that when executed by the processor, the plurality of instructions configure the server to: receive a query from a client node; receive at least one user-related parameter and at least one client node-related parameters; receive unstructured data collected from a plurality of data sources; generate a plurality of contextual activity streams respective of the received plurality of unstructured data and the received query; generate the customized singular activity stream respective of the at least one user-related parameter and the at least one client node-related parameter, wherein the customized singular activity stream include a plurality of data items from one or more of the plurality of contextual activity streams; cause a display of the customized singular activity stream over the client node.

BRIEF DESCRIPTION OF THE DRAWINGS

The disclosed subject matter is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
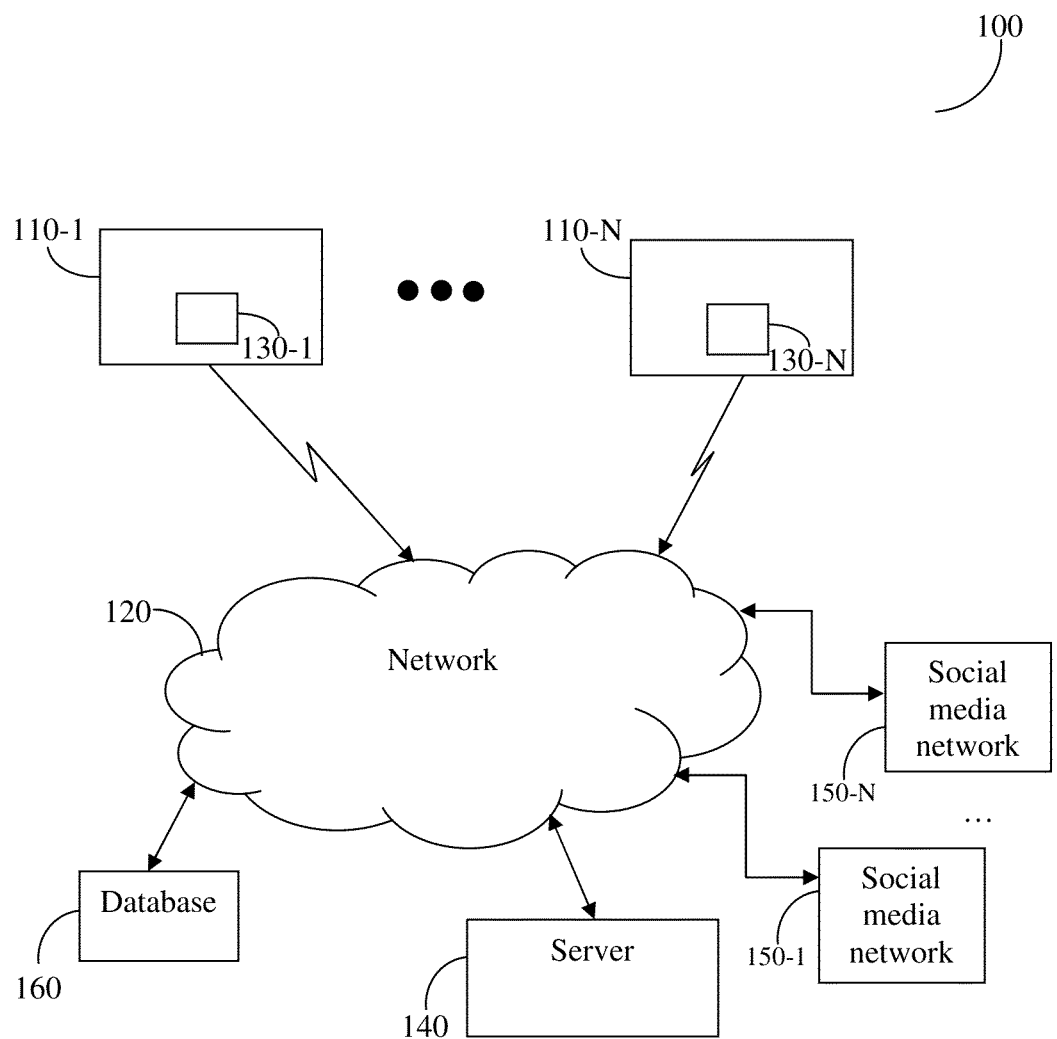
FIG. 1 is a schematic diagram of a network system utilized for illustrating the various disclosed embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments discussed herein include a system and method for generating contextual activity streams and the displaying them thereof respective of the context and the type of client device receiving the streams. In one embodiment, the system analyzes unstructured data content and identifies one or more tags within the data content. Based, in part on the tags the system generates, the context of the data content is identified. The system then creates one or more customized (contextual) activity streams respective of the context.

Different user devices have different capacities, such as a display's size, an operation system's type, look-and-feel characteristics, compatibilities with external network and devices, and so on. Such devices may be of the same kind, e.g., smartphone, but would still have different capacities. Therefore, in order to improve the user's experience, there is a need to customize the creation of an activity stream from the contextual streams to meet the capacities of the user device.

FIG. 1 depicts an exemplary and non-limiting block diagram of a network system 100 utilized to describe various disclosed embodiments. A plurality of client nodes 110-1 through 110-N, are communicatively connected to a network 120. The client nodes 110-1 through 110-N may be, for example, a personal computer, a tablet computer, a laptop computer, a smart phone, and so on. The network 120 may be wireless, cellular or wired, a local area network (LAN), a wide area network (WAN), a metro area network (MAN), the Internet, the worldwide web (WWW), and any combination thereof.

The system 100 further comprises agents 130-1 through 130-N respectively installed in the client nodes 110-1 through 110-N. Each of the agents 130-1 through 130-N may be implemented as an application program having instructions that reside in a memory of its respective client node. Each agent 130 is further communicatively connected to a server 140 over the network 120.

According to one embodiment, each agent 130 monitors data sources accessed by or through the respective client node 110. The data sources may include, but are not limited to, applications installed or operable on the client node or data sources with which the client 110 communicates. Examples for sources monitored by the agent 130 include, without limitation, mail applications, document collaboration applications, chat applications, phone calls, video conferences, social networks, enterprise network applications (e.g., SharePoint), VoIP applications, calendars, contacts, text messaging applications, instant messaging applications, and the like. The applications considered as data sources may be locally installed on a client node or may be accessed by the client node.

Each agent 130 is further configured to collect unstructured data from the data sources. Unstructured data content may be, for example, a document, a message such as an email message, chat correspondence, SMS messaging, images, video clips, and combinations thereof. The unstructured data collected by each agent 130 is sent to the server 140. In an exemplary embodiment, the agent 130 is configured to monitor document collaboration activities such as, for example and without limitation, co-authoring of documents. The collected information is then aggregated by the agent 130 and sent to the server 140.

In one embodiment, the collected unstructured data is flattened, i.e., converted to a unified data format that can be analyzed, by the server 140, for the purpose of displaying activity streams. In another embodiment, the data is collected by the agent 130 over a predefined amount of time or until a predefined number of records are gathered, prior to sending the information to the server 140.

According to the disclosed embodiments, each agent 130 is further configured to derive parameters related to the respective client node 110 the agent 130 is executed in, and the user operating the node. Client-related parameters related to the client node may be, for example and without limitation, a client device type (e.g., a tablet computer, a smart phone, etc.), an operating system's type, a screen's size, and the like. The user-related parameters include, for example, data sources that the user has access to, a list of preferable data sources and their priorities, registration information, parameters related to the user's experience indicating the user's preferences with regard to viewing in displayed information (e.g., zoom-level, font's size, etc.), and so on.

The server 140 is configured to analyze the received data as collected by each agent 130 to generate one or more contextual activity streams that may be of interest to a user of the respective client node 110. The generated activity streams are displayed over the client node 110 by means of a respective agent 130. For example, upon receiving the unstructured data from an agent 130-1, the server 140 is configured to analyze the received data, generate at least one contextual activity stream respective of the data analysis, and cause the display of the activity stream over the client node 110-1. The agent 130-1 is further configured to facilitate the communication between the respective client node 110-1 and the server 140.

In one embodiment, the agent 130 is configured to provide a graphical user interface in the client node 110. The graphical user interface includes a window displaying the various contextual activity streams and a search bar allowing the user to enter a search query for searching feeds in the displayed activity streams.

In order to generate and display contextual activity streams, the server 140 is configured to identify one or more tags from the collected unstructured data. Then, the server 140 is configured to determine the context of the received unstructured data content. The context is determined using, for example but without limitation, the tags, parameters identifying the user, correlation of certain data items in the collected data, and so on. The process for determining the context of the collected data is discussed in the details above. The parameters identifying the user can be extracted from the collected unstructured data (e.g., an email signature) or based on a user's profile. An example for a user profile that may be used herein can be found in co-pending U.S. application Ser. No. 13/853,297 filed 29 Mar. 2013, assigned to the common assignee and incorporated herein by reference.

The server 140, based on the determined context, generates one or more activity streams. A contextual activity stream is comprised of a collection of feeds gathered from a plurality of different social networks 150-1 through 150-N to which a user of an agent 130 is subscribed. In an embodiment, at least one of the social networks 150-1, 150-N is an enterprise network of an enterprise to which the user is related. Feeds including a contextual activity stream have a substantially similar context as the context determined by the server 140. In one embodiment, the activity stream comprises a search query that enables a user to determine the context displayed in the activity stream.

Figure 2:
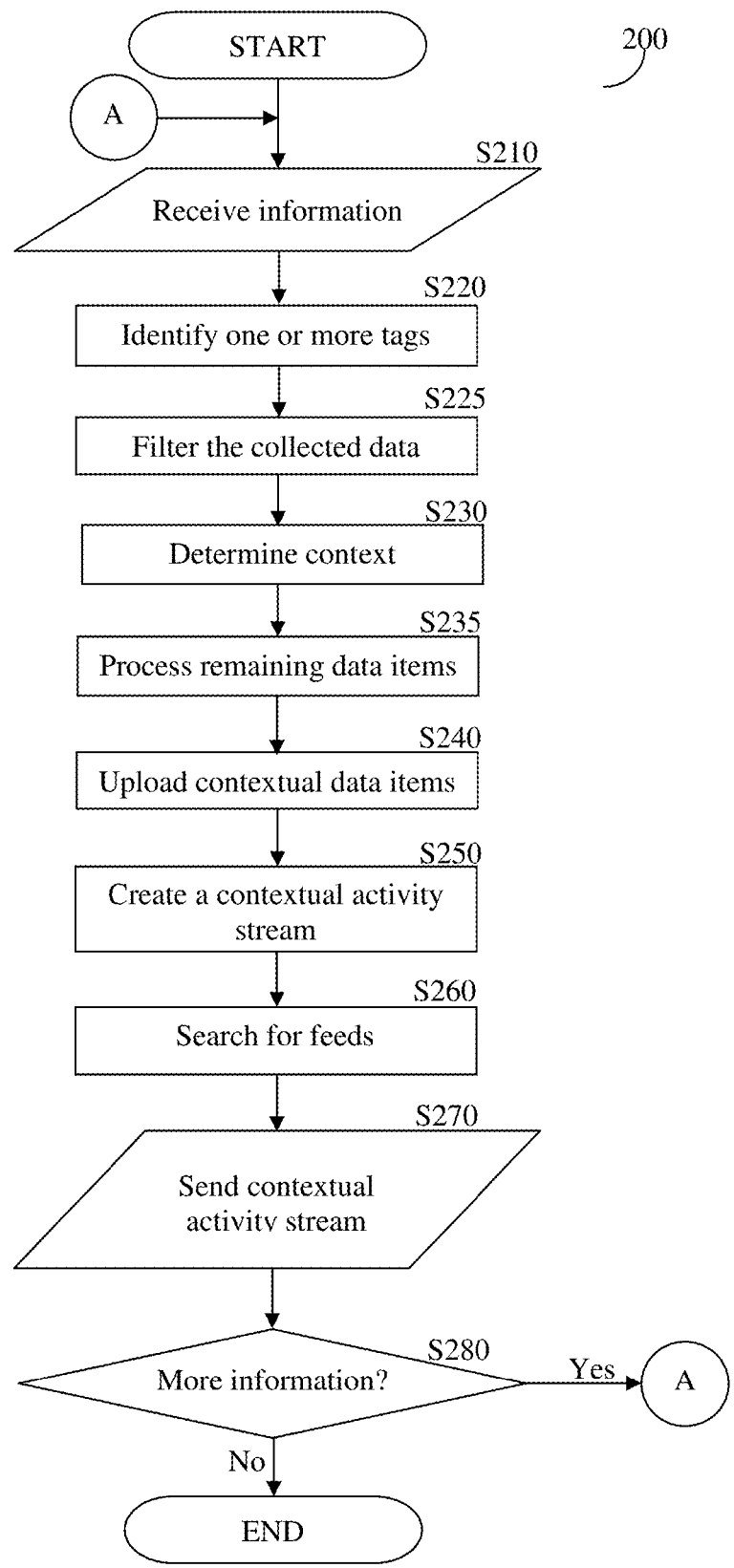
FIG. 2 is a flowchart describing a method for generating contextual activity streams according to one embodiment

FIG. 2 depicts an exemplary and non-limiting flowchart 200 describing a method for generating contextual activity streams according to one embodiment. The method can be performed by the server 140. The method will be described with a reference to a single agent 130 (e.g., agent 130-1) executed over a client node 110 (e.g., agent 110-1) merely for the sake of simplicity of the description.

In S210, unstructured data from a plurality of data sources as collected by the agent 130-1 is received at the server 140. In S220, one or more tags are identified in a received data. A tag is a predetermined index assigned to a textual term. It should be noted that one or more tags can be generated for the same term. A term may be a search query provided by a user of a client node 110. In one embodiment, S220 includes performing textual analysis to identify one or more terms preloaded from a database, and searching through the collected data for the appearances of the preloaded terms. In S225, data items in the collected unstructured data in which tags could not be identified are filtered out. The remaining data items are later processed by the server 140.

In S230, the context of the remaining data items is determined. According to one embodiment, the analysis of the tags includes a determination of whether a predefined term appears in the collected data above a certain threshold, and if a predefined term does appear, the context of the remaining data items is determined respective thereto.

In one embodiment, the contents of the remaining data items are correlated with the identified tags to determine the context. For example, if an identified tag is 'acquisition' and the correlation of the data items indicates 'contracts', then the context of the data items is determined to be 'legal' and/or 'acquisition legal transaction'.

In another embodiment, the identified tags are correlated with the parameters identifying the user in order to determine the context. Such parameters may be, for example, the user's company name, title, location, etc. For example, if an identified tag is 'Mobile Apps' and the user's title is 'VP Research & Development', the context of the remaining data items can be determined to be 'software development'. It should be noted that the identified tags and the users' parameters can be further correlated with the contents of the remaining data items.

In S235, the remaining data items are further processed to detect items that comply with the determined context. Such items are referred to hereinafter as contextual data items.

In S240, the contextual data items are uploaded to the one or more social networks 150-1, 150-N, so that such items can be shared with the user's connections (e.g., "friends" and/or "colleagues") across the social networks 150-1, 150-N.

In S250, a contextual activity steam is created for a user and contextual data items are inserted into the created activity stream. In addition, in S260, a search is made of social networks 150-1, 150-N for feeds (data items) shared by other users and matched to the determined context. Such feeds are also added to the created activity stream. A data item inserted into the contextual activity stream may include the actual item in its unstructured data form, or a link thereto.

In S270, the contextual activity stream is sent to the agent 130-1 for display on the client node 110-1. The agent 130-1 generates an interface on the display of the client node 110-1 for the display of the streams. In S280 it is checked whether additional information is collected, and if additional information is in fact collected, execution continues with S210; otherwise, execution terminates.

Figure 3:
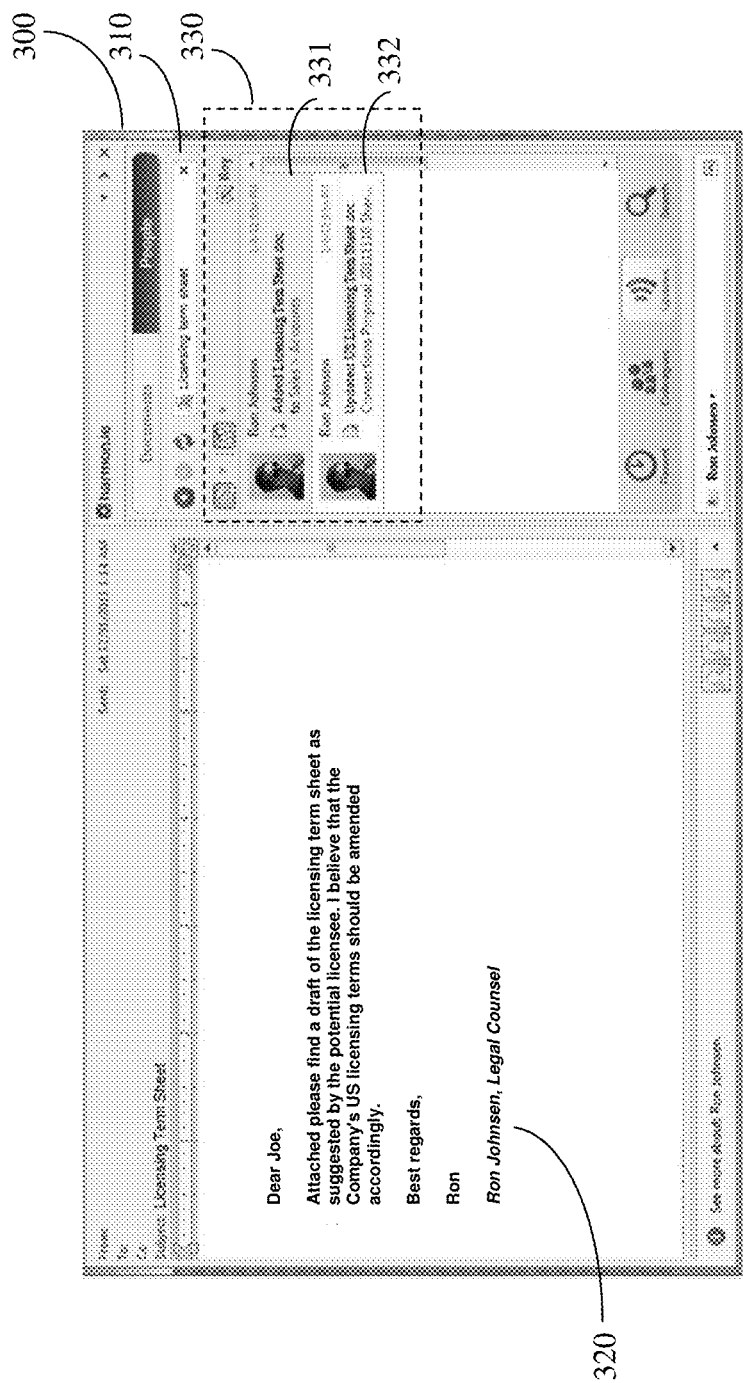
FIG. 3 is a screenshot of the display of a contextual activity stream generated according to one embodiment.

FIG. 3 depicts an exemplary and non-limiting screenshot 300 of a contextual activity stream 330 displayed on a client node according to one embodiment. The term "licensing term sheet" is received as a search query 310. The server 140 identified the tags "licensing term sheet" and "US licensing term sheet" from the content of a document 320. The analysis of the document 320 with the identified tags determines that the context is "licensing term sheet". Therefore, the contextual data items 331 through 332 included in the stream 330 are all related to "licensing term sheet". Some of the data items 331 through 332 include a link to files referenced in the document 320. Upon identification of additional appropriate unstructured data content, the additional appropriate unstructured data content appears in an appropriate activity stream.

Figure 4:
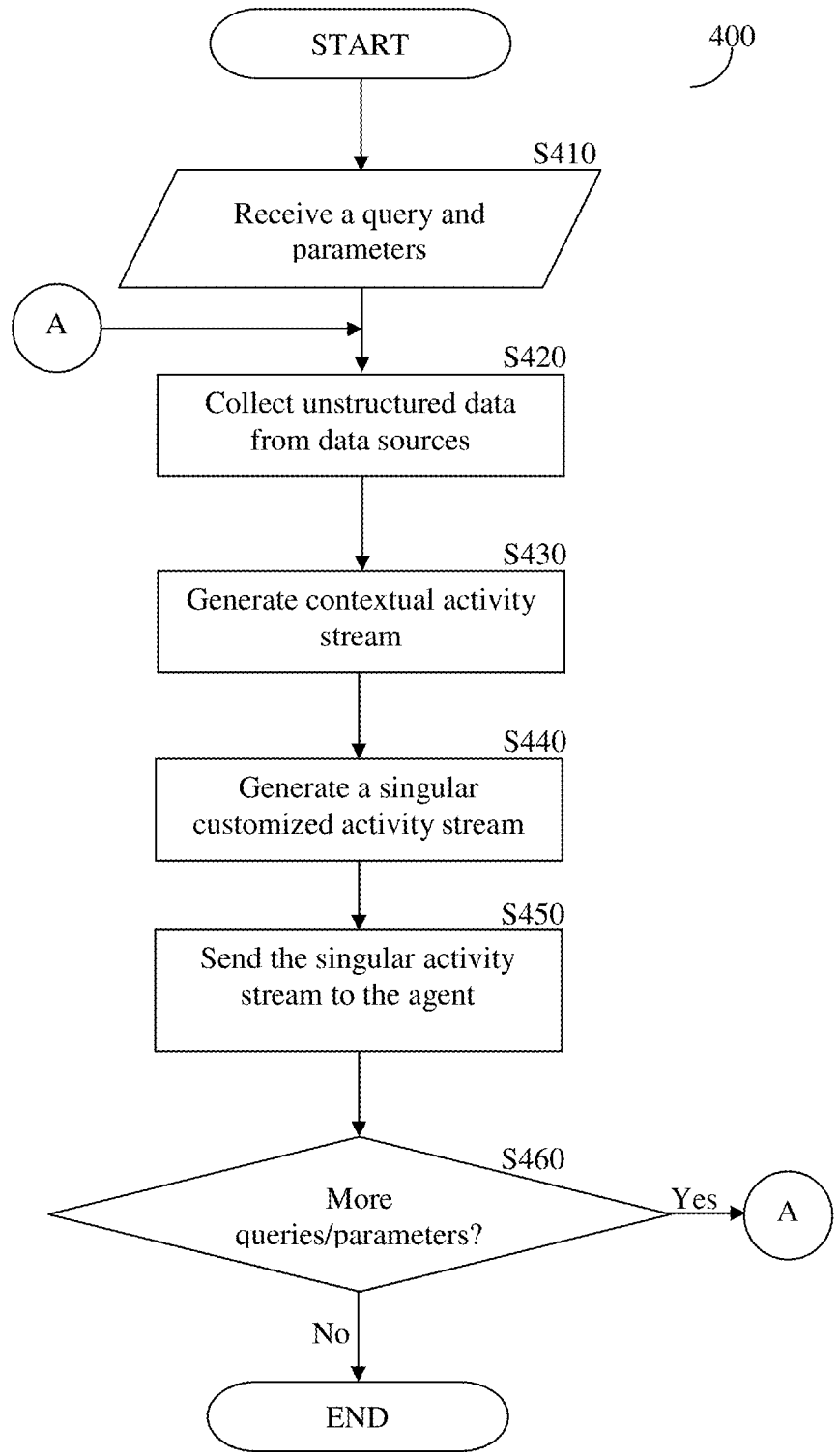
FIG. 4 is a flowchart describing a process of aggregation and display of activity streams collected from a plurality of sources respective of a client node type according to one embodiment

FIG. 4 depicts an exemplary and non-limiting flowchart 400 describing a method for generating a customized singular data stream according to one embodiment.

In S410, at least a search query and parameters related to at least one of the client node and the user are received at the server 140. The received information is gathered and derived by an agent 130 of the respective node 110. In one embodiment, the search query may be a textual query entered by a user of a client node 110. The node related parameters include, for example, a device type, an operating system type, a size of a display area, look-and-feel characteristics, compatibilities with external networks and devices, and the like. The user-related parameters include, for example, data sources that the user has access to, a list of preferable data sources and their priorities, registration information, parameters related to the user's experience indicating the user's preferences with regard to viewing in displayed information (e.g., zoom-level, font's size, etc.), and so on. Optionally, in S420, unstructured data from a plurality of data sources as collected by the agent 130-1 is received at the server 140. The collection of the unstructured data is discussed above.

In S430, one or more contextual activity streams respective of each of the one or more data sources are gathered. The generation of a contextual activity stream is further described hereinabove with respect of FIG. 2. In S440, a customized singular activity stream is generated respective of the one or more of the received parameters. In a particular embodiment, the singular activity stream is customized to allow proper display of the stream's contents in the client node's display. The display capabilities of the client node can be determined based on at least one of the available display's area, operating system type, the node (device) type, and look-and-feel characteristics, and any combination thereof.

As an example, a client node that is a smartphone may have a relatively small display area (but is different for different type of devices), and thus a limited number of data items can be displayed without having the user to scroll through the display.

According to various embodiments, in order to generate a customized singular activity stream, data items from one or more contextual data streams are selected and then aggregated to be included in the single activity stream. In an embodiment, the number of the selected data items is determined based on the available display area and the user's experience parameters. In one embodiment, the data items from contextual data streams having strong correlation to the search query are selected.

In another embodiment, a number of top data items from each contextual data stream are selected. The number of top items is a function of the number of generated contextual data streams as well as the total number of data items that can be aggregated to the singular activity stream. In yet another embodiment, data items or top data items included in contextual data streams, resulted from preferable data sources, are then aggregated. The preferable data sources are designated in the user-related parameters. For example, the preferable data sources may be SharePoint and email applications, thus only data items gathered from such applications will be aggregated to the singular activity stream. The preferable data sources may be also prioritized, thus the selection is performed based on the preferable data source priorities. The contents of the singular data stream are updated, in real-time, as the contextual data streams are updated and/or the user views items in the singular activity stream.

In S450, the singular activity stream is sent to the agent 130 for display on the client node 110. As noted above, the agent 130 generates an interface on the display of the client node 110 for the display of the streams. According to one embodiment, the agent includes a feeder component that is configured to update the contents of the displayed activity stream in real-time. In one embodiment, data items the user already viewed are withdrawn from the feeder, and only new data items are aggregated and added to activity stream for display. In another embodiment, the activity steam is displayed by means of a multimedia player. In S460, it is checked whether additional queries and/or parameters are received, and if so, execution continues with S420; otherwise, execution terminates.

Figure 5:
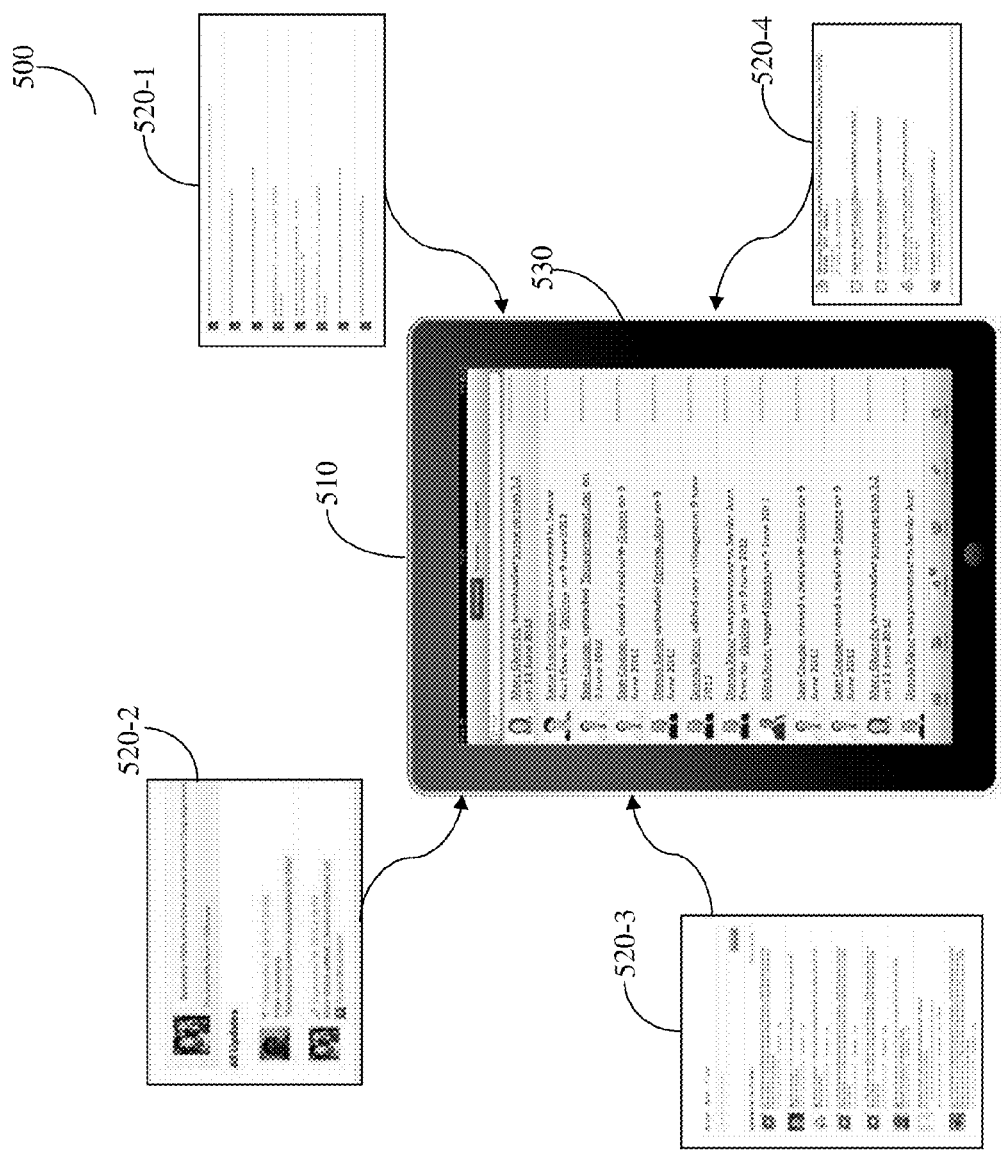
FIG. 5 is an exemplary screenshot illustrating a customized singular activity stream provided according to one embodiment.

FIG. 5 depicts an exemplary and non-limiting screenshot 500, illustrating a display of a customized activity process over a tablet computer 510. There are four contextual data streams 520-1 through 520-4 generated by the server 140 respective of an input query. Then, respective of the display's area of the tablet computer 510, data items form the contextual activity streams 520-1 through 520-4 are aggregated to a singular activity stream 530 which is then displayed on the computer's display 510.

The various embodiments may be implemented, for example, as hardware, firmware, software, or any combination thereof. Moreover, the software is preferably implemented as an application program tangibly embodied on a program storage unit or tangible computer readable medium consisting of parts, or of certain devices and/or a combination of devices. The application program may be, for example, uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another appropriate graphical user interface of an internet mobile application, either generic or tailored for the purposes described in detail hereinabove.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for generating and displaying a customized singular activity stream, comprising:
receiving a query from a client node;
receiving at least one user-related parameter and at least one client node-related parameter;
receiving unstructured data collected from a plurality of data sources;
generating a plurality of contextual activity streams based on the received unstructured data and the received query, wherein generating the plurality of contextual activity streams further includes determining a context of the unstructured data based on at least one tag of the unstructured data;
generating a customized singular activity stream based on the at least one user-related parameter and the at least one client node-related parameter, wherein the customized singular activity stream includes a plurality of data items from at least one of the plurality of contextual activity streams; and
causing a display of the customized singular activity stream over the client node.

2. The method of claim 1, wherein the at least one user-related parameter includes at least one of: registration information, a list of data sources that the user has access to through the client node, a list of preferable data sources, and identifiers related to the user's experience.

3. The method of claim 2, wherein each of the data sources is any one of: a mail application, a chat application, a phone call list, a video conferencing application, a social network, an enterprise social network, and a data collaboration application.

4. The method of claim 1, wherein the at least one client node-related parameter is at least one of: a client node's type, a client node's operating system type, a size of the client node's display area, look-and-feel characteristics, and compatibilities with external networks or devices.

5. The method of claim 4, wherein the client node type is any one of: a personal computer (PC), a tablet computer, a laptop computer, a notebook computer, and a smart phone.

6. The method of claim 3, wherein the singular activity stream is customized to allow proper display over the client node's display.

7. The method of claim 6, further comprising:
determining display capabilities of the client node based on the least one client node-related parameter;
determining the number of data items that can be properly displayed based on the display capabilities;
selecting the plurality of data items from the plurality of contextual activity streams, up to the number of data items that can be properly displayed;
aggregating the selected plurality of data items; and
including the aggregated plurality of data items in the customized singular activity stream.

8. The method of claim 7, wherein selecting the plurality of data items further comprises at least one of: selecting the plurality of data items from contextual data streams having a strong correlation to the received query; selecting top data items from each of the contextual data streams; and selecting the plurality of data items included in the plurality of contextual data streams that resulted from preferable data sources.

9. The method of claim 7, further comprising:
updating, in real-time, the customized singular activity stream as the user views the plurality of data items included therein.

10. A non-transitory computer readable medium having stored thereon instructions for causing one or more processing units to execute the computerized method according to claim 1.

11. A system configured to generate and display a customized singular activity stream comprising:

a network interface communicatively connected to a network;

a processor;

a memory coupled to the processor containing a plurality of instructions that when executed by the processor, configure the server to:

receive a query from a client node;

receive at least one user-related parameter and at least one client node-related parameter;

receive unstructured data collected from a plurality of data sources;

generate a plurality of contextual activity streams based on the received plurality of unstructured data and the received query, wherein generating the plurality of contextual activity streams further includes determining a context of the unstructured data based on at least one tag of the unstructured data;

generate the customized singular activity stream based on the at least one user-related parameter and the at least one client node-related parameter, wherein the customized singular activity stream includes a plurality of data items from at least one of the plurality of contextual activity streams; and cause a display of the customized singular activity stream over the client node.

12. The system of claim 11, wherein the at least one user-related parameter includes at least one of: registration information, a list of data sources that a user has access to through the client node, a list of preferable data sources, and identifiers related to the user's experience.

13. The system of claim 12, wherein each of the data sources is any one of: a mail application, a chat application, a phone call list, a video conferencing application, a social network, an enterprise social network, and a data collaboration application.

14. The system of claim 12, wherein the at least one client node-related parameter is at least one of: a client node's type, a client node's operating system type, a size of the client node's display area, look-and-feel characteristics, and compatibilities with external networks and devices.

15. The system of claim 14, wherein the client's node's type is any one of: a personal computer (PC), a tablet computer, a laptop computer, a notebook computer, and a smart phone.

16. The system of claim 13, wherein the singular activity stream is customized to allow proper display over the client node's display.

17. The system of claim 16, wherein the server is further configured to:

determine display capabilities of the client node based on the at least one client node-related parameter;

determine the number of data items that can be properly displayed based on the display capabilities;

select the plurality of data items from the plurality of contextual activity streams, up to the number of data items that can be properly displayed;

aggregate the selected plurality of data items; and include the aggregated plurality of data items in the customized singular activity stream.

18. The system of claim 17, wherein the selection of the plurality of data items further comprises at least one of: selection of the plurality of data items from contextual data streams having a strong correlation to the received query; selection of top data items from each of the plurality of contextual data streams; and selection of the plurality of data items included in the plurality of contextual data streams that resulted from a list of preferable data sources.

19. The system of claim 17, wherein the server is further configured to:

update, in real-time, the customized singular activity stream as the user views the data items included therein.

* * * * *